United States Patent [19]
Harner et al.

[11] 4,277,940
[45] Jul. 14, 1981

[54] INTEGRAL ROCKET-RAMJET CLOSED LOOP FUEL CONTROL SYSTEM

[75] Inventors: Kermit I. Harner, Windsor; John P. Patrick, South Windsor, both of Conn.

[73] Assignee: United Technologies Corporation, Hartford, Conn.

[21] Appl. No.: 60,444

[22] Filed: Jul. 25, 1979

[51] Int. Cl.$^3$ ............................................. F02K 9/06
[52] U.S. Cl. .................................. 60/243; 60/245; 60/250; 60/270 R
[58] Field of Search .............. 60/243, 245, 250, 270 R

[56] References Cited

U.S. PATENT DOCUMENTS

| | | | |
|---|---|---|---|
| 2,777,289 | 1/1957 | Boucher | 60/270 R |
| 2,861,420 | 11/1958 | Lewis | 60/270 R |
| 2,912,820 | 11/1959 | Whitmore | 60/270 R |
| 2,941,359 | 6/1960 | Miller et al. | 60/39.28 R |
| 2,954,667 | 10/1960 | Laurent et al. | 60/243 |
| 2,956,398 | 10/1960 | Muhlfelder | 60/270 R |
| 3,102,387 | 9/1963 | Caspar et al. | 60/243 |
| 3,218,801 | 11/1965 | Vasu | 60/243 |

OTHER PUBLICATIONS

Harner et al., "Control Systems Requirements for Advanced Ramjet Engines", AIAA Conference, Jul. 1978.

*Primary Examiner*—Robert E. Garrett
*Attorney, Agent, or Firm*—John D. Del Ponti

[57] ABSTRACT

In an integral rocket-ramjet having a combustor which initially serves as a rocket combustion chamber for booster propellant, and after the booster propellant is expended serves as a ramjet combustor where fuel and air are burned, a fuel control system is described for the ramjet stage by which ram burner light-off is automatically initiated upon transition from rocket to ramjet propulsion. The fuel control regulates fuel flow to the combustor over the entire flight regime and responds to operating conditions to provide a light-off schedule, to stabilize the shock wave at the air inlet, to provide a maximum fuel-to-air ratio limit, to limit the maximum vehicle Mach number, and to prevent lean burner blowout by providing a minimum fuel-to-air ratio limit. Mach number limiting and air inlet margin limiting are performed in closed loop fashion, while the other functions are scheduled or open loop controls. The closed loop functions are performed by scheduling a ratio of combustion chamber pressure to a reference pressure, and comparing this ratio to the ratio of the pressures as measured, any error therebetween being used to produce a desired fuel flow to combustion chamber pressure ratio. By measuring the actual combustion chamber pressure, the desired fuel flow is obtained.

13 Claims, 4 Drawing Figures

INTEGRAL ROCKET-RAMJET CLOSED LOOP FUEL CONTROL SYSTEM

The Government has rights in this invention pursuant to Contract No. F33614-74-C-2059 awarded by the Department of the Air Force.

BACKGROUND OF THE INVENTION

1. Field of the Invention

This invention relates to a fuel control system for integral rocket-ramjets which is automatically actuated upon transition from rocket to ramjet propulsion and which provides the limiting functions necessary to prevent the engine, air inlet and vehicle from operating in unacceptable regions. The fuel control modulates thrust by controlling fuel flow to perform the functions of ramjet light-off, inlet margin limiting, maximum fuel-to-air ratio limiting, vehicle velocity or Mach number limiting, and lean blowout limiting. Inlet margin limiting and vehicle velocity or Mach number limiting are performed in a closed loop fashion to provide extremely accurate control, particularly during the period immediately after ramjet light-off.

2. Description of the Prior Art

The concept of ramjet propulsion for vehicles was initiated in the early 1900's and practical development evolved in the 1940's. Since then numerous advances have been made in this technology, and applications to advanced missiles is predicted for the future.

Rockets have been known for many centuries and led to practical applications during World War II and thereafter, with both solid fueled and liquid fueled rockets used as weapons and for space exploration.

The marriage of the ramjet and rocket took place during the 1960's when the integral rocket-ramjet (IRR) was developed for missile applications. In 1967, the low altitude short-range missle, LASRM, was developed. The basic IRR is a combined propulsion system. Ramjet fuel is sealed off from the rocket fuel so that the IRR starts out as a pure rocket engine using rocket fuel in the ramjet combustion chamber, and a rocket nozzle inside the ramjet nozzle. During the rocket boost, the ramjet air inlets are typically covered with blow-off fairings and the air openings to the combustion chamber are sealed off with blow-off plugs. When the rocket fuel burns out, the blow-off fairings, inlet plugs and rocket nozzle are ejected leaving a ramjet propulsion system which is then ignited. Numerous configurations of IRR's have been developed, and this invention is applicable to any IRR in which a liquid fuel is fed to the ramjet combustion chamber and ignited upon termination of the rocket phase.

The basic ramjet consists of a supersonic air inlet, a combustor, a fuel supply system and an exhaust nozzle. The supersonic air inlet admits air to the engine, reduces the air velocity, and interfaces with the combustor which develops combustor pressure. The combustor adds heat and mass to the air by burning the fuel from the fuel supply and thereby increases combustor pressure. The nozzle converts combustion chamber pressure to kinetic energy to produce thrust.

The fuel to the ramjet is supplied from a storage tank by pumping or pressurization. A fuel control modulates fuel flow to prevent the engine, inlet and vehicle from operating in unacceptable regions. The control must permit thrust modulation over as large a range as is practical without exceeding the operating constraints to optimize vehicle performance. The fuel control matches fuel flow with airflow to maintain the fuel-to-air ratio within limiting values for both lean and rich mixtures. Operation is closely interrelated with conditions in both inlet and combustor. The fuel control must also maintain an appropriate initial flow of fuel during transition from rocket to ramjet operation, control inlet pressure margin, and limit flight Mach number. A ramjet fuel control may be considered an air inlet control in that it positions the shock wave at a desirable location in the ramjet inlet and meters fuel as required to maintain that shock position for the inlet margin limiting region of the flight envelope.

Numerous fuel controls for ramjets are known in the prior art, most of which have disadvantages such as inability to provide proper fuel flow over the large range of operating conditions encountered during high performance ramjet operation. More specifically, prior art ramjet fuel controls did not take into account the effect of the shock wave produced at the air inlet and thus often encountered operating conditions where vehicle performance deteriorated.

The present invention improves high performance ramjet operation by scheduling fuel via a novel fuel control system in which some functions are performed open loop, while the more critical functions are performed in a more accurate, closed loop fashion. The fuel schedules prevent the engine, inlet and vehicle from operating in inefficient or unacceptable regions, and provide thrust modulation over a wide range of operating conditions. The control is adaptable to a wide variety of vehicle configurations, and has the advantages of low cost, high reliability, and low weight and volume.

The basic control parameters are derived using electronic devices, and are adapted to digital implementation, while the actual fuel metering is performed by proven hydromechanical controls.

It is thefore an object of this invention to provide a ramjet fuel control which meters fuel to the ramjet combustor to insure safe ram burner light-off and transition from rocket to ramjet propulsion.

Another object of this invention is a ramjet fuel control which meters fuel to the ramjet combustor via a closed loop control to prevent the air inlet from operating in an unstable region.

A further object of this invention is a ramjet fuel control which provides both maximum and minimum fuel-to-air ratio limits for optimizing operation and preventing lean burner blow-out.

Another object of this invention is a ramjet fuel control which provides a closed loop maximum vehicle Mach number control.

A still further object of this invention is a ramjet fuel control in which closed loop Mach number and air inlet controls modulate fuel flow via a control parameter-defined as the ratio of combustion pressure to a reference pressure.

Another object of this invention is a ramjet fuel control in which scheduled values of the ratio of fuel flow to combustion chamber pressure are used to provide the desired fuel flow.

SUMMARY OF THE INVENTION

In accordance with a preferred embodiment and the best operating mode of this invention, there is provided a ramjet fuel control system for an integral rocket-ramjet vehicle. Upon termination of the rocket boost and jettisoning of the rocket nozzle and inlet and combustor port covers, air is admitted to the ramjet combustor, ramjet fuel flow is initiated and ignition of the fuel occurs.

The control schedules a reduced fuel flow for light-off. A closed loop inlet margin control schedules fuel flow immediately after ramjet light-off to maintain the desired air inlet margin and properly position the shock wave at the inlet. The inlet margin control schedules the ratio of combustor pressure to a reference pressure as a function of vehicle Mach number and angle of attack. A closed loop vehicle Mach number control is provided where the limiting Mach number is a function of pressure altitude and schedules a ratio of combustor pressure to a reference pressure to limit vehicle speed to acceptable structural and/or aerodynamic heating characteristics. A least select circuit is used to select the Mach number schedule or the inlet margin schedule, whichever calls for the lowest fuel flow. The selected signal is then compared with the measured ratio of combustor pressure to the reference pressure to provide an error signal. The error signal schedules fuel flow proportional to the integral of chamber pressure error. Clamps are provided to insure that fuel flow does not exceed either a minimum or a maximum fuel-to-air ratio, the maximum schedule providing optimum operating conditions during acceleration and the minimum schedule preventing lean burner blow-out during certain operating conditions. The fuel scheduling parameter is the ratio of fuel flow to combustion chamber pressure. The fuel flow is modulated by a hydromechanical control in response to measured combustion chamber pressure.

DESCRIPTION OF THE PREFERRED EMBODIMENT

Figure 1:
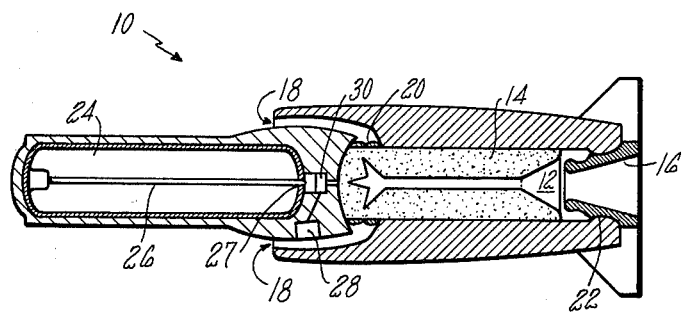
FIG. 1 is a schematic diagram of an integral rocket-ramjet vehicle.

Referring to FIG. 1, there is shown a representative integral rocket-ramjet vehicle 10 in schematic form. The precise vehicle structure will vary and numerous designs are possible but the basic operation is similar. While FIG. 1 is a simplified schematic drawing, it shows the essential features of the vehicle. The rocket portion of the vehicle 10 includes a dual purpose combustion chamber 12 which contains solid rocket fuel 14, and a rocket nozzle 16 clamped to the back end of the combustion chamber. An air inlet 18 is blocked by a combustion port cover 20. Operation of rockets is well known and does not form a part of this invention. At the termination of rocket thrust, the booster nozzle 16 and its associated clamp, and the port cover 20, are jettisoned. In some vehicles both an air inlet port cover and a combustor port cover are used. In either case, air is now fed through inlet 18 into combustion chamber 12 and ramjet operation is initiated. A ramjet nozzle is located as shown by reference numeral 22. Ramjet fuel is contained in a chamber 24 at the front of the vehicle and fed via duct 26 into turbopump 27 and thence into the combustion chamber 12 through injectors, not shown. A fuel control 28 for modulating the flow of ramjet fuel is connected to a valve 30 in the fuel supply duct 26. The valve 30 is opened in response to a signal that rocket boost is terminated, typically by a switch connected to the combustor cover 20 which provides a signal indicating that it has been jettisoned, thereby admitting air to the combustion chamber. At the same time a signal is fed to a solenoid which initiates ramjet ignition. The above sequence of operation is well known and does not form a part of the present invention.

Figure 2:
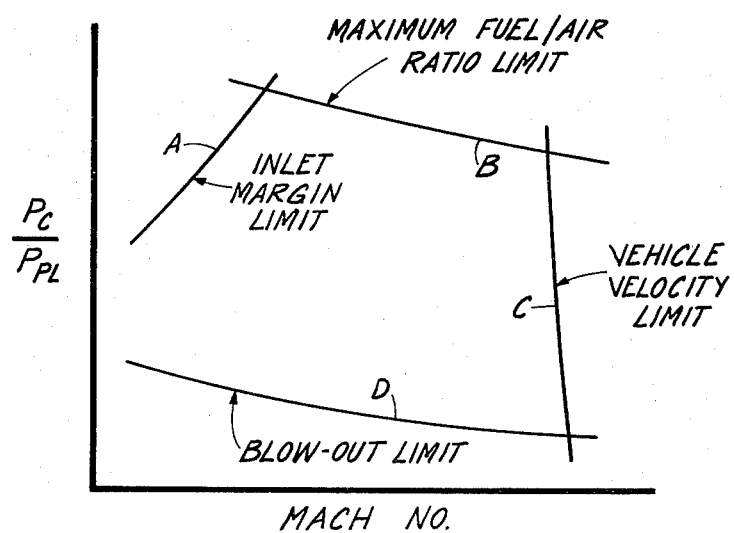
FIG. 2 is a graph showing the control limits for the ramjet fuel control as a function of Mach number versus the ratio of combustion pressure to a reference pressure.

FIG. 2 shows the control limits provided by the novel fuel control of this invention. The limits are shown in the form of a control limit map in which the limits are plotted as a function of vehicle Mach number versus a scheduling parameter $P_C/P_{PL}$ where $P_C$ is combustion chamber pressure or an inlet pressure closely related to combustion chamber pressure and $P_{PL}$ is a reference pressure, preferably provided by a pitot probe located on the cowl lip or on the compression ramp. The ratio $P_C/P_{PL}$ is the control parameter used to determine inlet pressure recovery. The control limits consist of: air inlet margin limiting, line A; maximum fuel-to-air ratio limit, line B; vehicle velocity of Mach number limit, line C; and minimum fuel-to-air ratio limit, also referred to as blow-out limit, line D. Ordinarily the air inlet margin limit is encountered immediately following transition from rocket to ramjet propulsion. Then as the vehicle accelerates to its cruise condition, the maximum fuel-to-air ratio limit is encountered until the vehicle Mach number or velocity limit is reached, the latter limit generally being scheduled as a function of altitude. The Mach number limiting function and the inlet margin limit are controlled in a closed loop manner, while the other functions are scheduled or open loop controls. The minimum fuel-to-air ratio limit, or blow-out limit, is required to prevent lean burner blow-out for dive conditions where the vehicle Mach number exceeds the limiting value and fuel flow is considerably reduced.

In integral rocket-ramjet applications, there is a need to make a rapid transition from the booster or rocket mode of operation to ramjet operation to minimize the Mach number loss during this unpowered portion of flight. The following sequence of events typically occurs in this transition region. A decay in booster thrust, known as booster tail-off begins with a typical duration of about 0.1 seconds. Upon the sensing of booster tail-off, the booster rocket nozzle, the inlet cover and the combustor port cover are ejected. Airflow then exists through the booster case which is also used as the ramjet combustion chamber. The fuel control shut-off valve is opened near the end of booster tail-off, and the ramjet fuel manifold is rapidly filled to provide fuel flow through the injector nozzles into the ramjet combustion chamber as soon as possible after booster tail-off. The ramjet igniter is then energized, the turn-on time and time duration sequenced such that the igniter is operative when ramjet fuel flow starts through the injectors. Ramjet burner ignition occurs essentially as a step function, and since immediately after ignition additional energy sources such as igniter fuel, liner material and insulating material can burn and provide a substantial rise in the temperature and pressure of the ramjet combustion chamber. It is important to schedule a fuel-to-air ratio for light-off which will prevent inlet unstart even when the additional energy sources contribute to the combustor pressure rise immediately after ignition.

Since the ignition occurs essentially as a step function and the inlet shock motion is extremely rapid, it is impossible to make the closed loop control respond fast enough to prevent an inlet unstart if the light-off flow is excessive. After the light-off a closed loop inlet margin control assures safe and stable inlet operation while the additional sources of energy are consumed and during the vehicle acceleration phase.

Since an excess of ramjet fuel should not be in the combustion chamber during ramjet light-off in order to prevent inlet unstart, the safest and preferred fuel control operation is to open the ramjet fuel shut-off valve when the combustor port cover is released.

Figure 3:
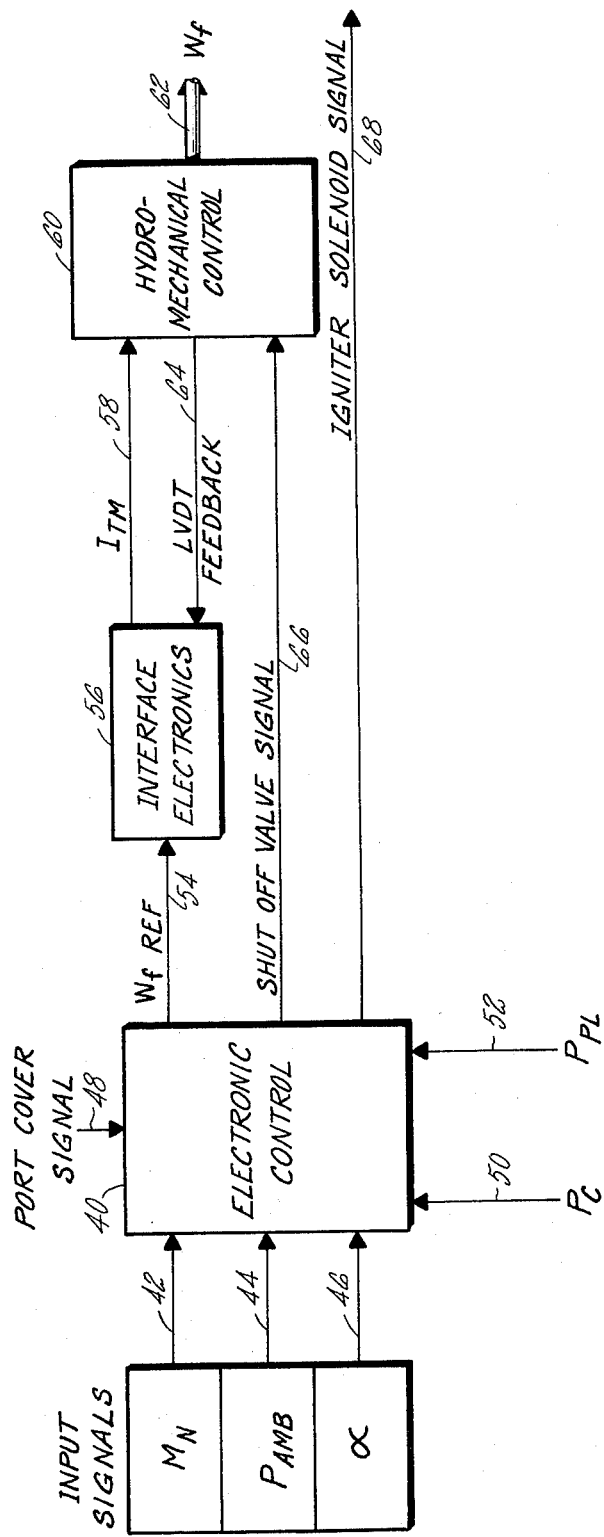
FIG. 3 is a schematic block diagram of a simplified implementation of the ramjet fuel control system.

Referring to FIG. 3, there is shown a simplified schematic implementation of the fuel control of this invention. The heart of the fuel control is the electronic control 40 to which is fed input signals consisting of vehicle Mach number, Mn, via signal line 42, vehicle pressure altitude $P_{AMB}$, via signal line 44, and vehicle angle of attack, $\alpha$, via signal line 46. These signals may be provided by an air data computer if one is available. As an alternative, a typical conical or wedge probe which senses nose pitot pressure and top and bottom static pressures can be used to provide Mach number, angle of attack and altitude information. A separate pressure transducer may be used to provide the pressure altitude signal.

Also fed to the electronic control 40 is a signal indicative of the jettisoning of the combustor port cover via signal line 48, a combustion chamber pressure signal, $P_C$, on line 50, and a reference pressure signal on line 52, this pressure being shown as $P_{PL}$ and preferably being provided by a pitot probe at the cowl lip. Other pressures such as a pitot probe pressure from the inlet compression ramp can also be used as the reference pressure. Ideally, it is desirable to use a reference pressure such that the control parameter $P_C/P_{PL}$ would be essentially constant to achieve a constant inlet margin over the complete range of operating conditions, i.e. Mach numbers and angles of attack.

The electronic control 40 is preferably a digital computer or microprocessor which schedules desired fuel flow, W REF, on signal line 54.

Figure 4:
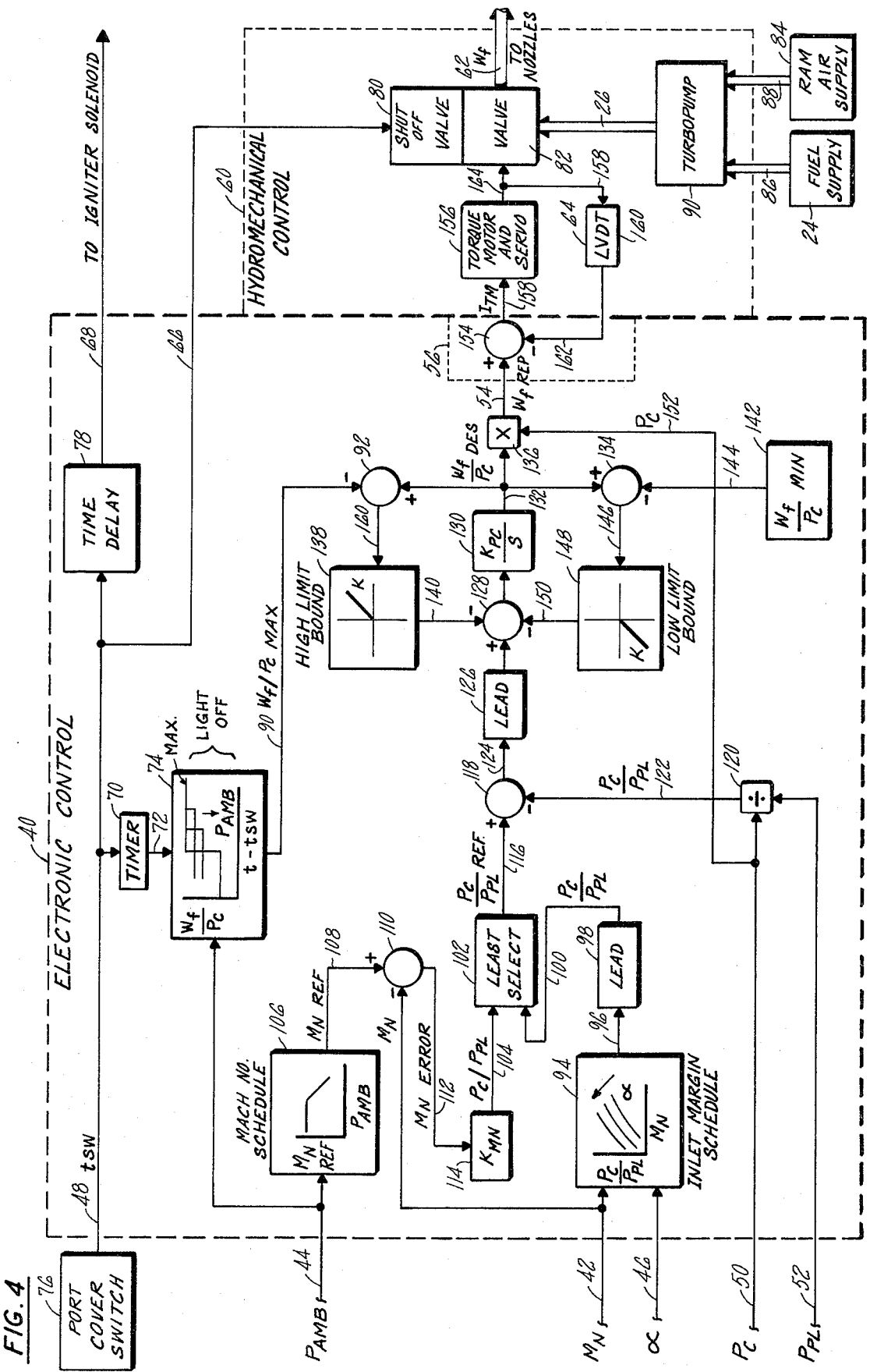
FIG. 4 is a schematic block diagram of the complete ramjet fuel control system.

The signal on line 54 is fed to the interface electronics, block 56, and, as will be described in detail with respect to FIG. 4, is converted on signal line 58 into a torque motor current signal, $I_{TM}$, fed to a hydromechanical control 60. The hydromechanical control 60 meters the flow of fuel to the combustor nozzles via duct 62.

Feedback is provided from the hydromechanical control 60 to the interface electronics 56 via a signal line 64 which contains a linear variable displacement transducer.

The combustor port cover signal on signal line 48 schedules, via electronic control 40, a shut-off valve signal on line 66 which opens the metering valve in the hydromechanical control 60. This signal also schedules, on signal line 68, a signal which actuates the igniter solenoid to create ignition in the combustion chamber at the proper time.

FIG. 4 shows the preferred implementation of the fuel control system. Shown in dotted lines are the details of the electronic control 40. The interface electronics 56, and the hydromechanical control 60, as shown in blocks in FIG. 3. The electronic control 40 will be assumed to be implemented in a digital manner, this being considered the best mode, but analog circuitry may also be used.

The light-off schedule and the maximum fuel-to-air ratio schedule, line B of FIG. 2, are combined in block 74 of electronic control 40. A switch 76 is connected to the combustor port cover 20 of FIG. 1, and is actuated upon jettisoning of the port cover 20 during booster rocket tail-off. The switch 76 produces a signal, $t_{sw}$, on signal line 48, this signal being fed to a timer 70 to initiate actuation of the timer and produce a signal, $t - t_{sw}$ where t is time, the signal $t - t_{sw}$ being fed via line 72 to schedule block 74. The $t_{sw}$ signal on line 48 is also fed to a time delay circuit 78, and then via signal line 68 to the ramjet igniter solenoid, not shown, to initiate light-off of the ramjet after the fuel manifold in the combustion chamber has been filled with fuel. The $t_{sw}$ signal on line 48 is also fed via line 66 to the hydromechanical control 60 where it de-actuates the shut-off solenoid 80 of fuel flow valve 82 permitting flow of fuel therethrough as scheduled by the fuel control system. Fuel from the tank 24, and a portion of the air bled from inlet 18 via a bleed duct, not shown, and illustrated in FIG. 4 as reference numeral 84, are fed via lines 86 and 88 respectively to a turbopump 90, the pump being driven by the bleed air and fuel being fed by the turbopump via duct 26 to valve 82. Valve 82 is a metering valve and typically includes a throttle valve, shut-off valve and pressure regulating valve. The construction of the valving arrangement is well known to those skilled in the art and is not described in detail.

Also fed to the light-off and maximum fuel-to-air ratio schedule block 74 is the pressure altitude signal, $P_{AMB}$, on signal line 44. Schedule block 74 is bi-variant in that it provides at its output a $W_f/P_C$ signal as a function of both the $t - t_{sw}$ signal on line 72, and as a function of the $P_{AMB}$ altitude signal on line 44, so that the light-off value of $W_f/P_C$ and the time duration thereof are determined as a function of altitude, a lower light-off value being provided at lower altitudes where inlet unstart is more apt to occur. $W_f$ is fuel flow rate. In essence, for a time after the port cover is jettisoned, fuel flow is scheduled at a low light-off value, and after a time determined by the schedule in block 74 is increased to the maximum fuel-to-air ratio value. The time delay in energizing the igniter provided by block 78 permits the fuel to fill the manifold between the fuel shut-off valve and the fuel injectors prior to initiating ignition. Thus, initially the output signal from schedule block 74 on signal line 90 schedules a reduced light-off fuel flow, the precise value thereof being a function of pressure altitude and $P_{AMB}$, and then at a later time, scheduled as a function of altitude, is increased to a maximum value of $W_f/P_C$. The signal $W_f/P_C$ on line 90 is fed as one input to a comparator 92.

Immediately after ramjet ignition has occurred, it is desirable to modulate fuel flow to provide the maximum ramjet thrust available at the particular flight conditions. In general, at low Mach numbers, the maximum thrust is limited by the air inlet operating conditions. Ram burner ignition occurs essentially as a step function, and inlet unstart can occur in a few milliseconds. Immediately after ignition, additional energy sources exist such as igniter fuel, liner material, insulation or thermal protection material, etc., which can provide a substantial temperature and pressure rise in the ramjet combustion chamber. As noted with respect to scheduling block 74, a lower than normal fuel-to-air ratio light-off schedule is required to maintain satisfactory inlet margin during this period. However, immediately after ramjet ignition occurs, a closed loop inlet margin control takes over control of fuel flow. There is no need to wait until the additional sources of energy are completely consumed with a feedback type of closed loop control since the control will modulate fuel flow up and down from the light-off value to achieve the chamber pressure required at the existing operating condition. During and immediately following light-off, the ramjet fuel flow must be near the minimum fuel-to-air ratio blowout limit to prevent inlet unstart. Immediately after ramjet ignition has occurred, it is desirable to modulate fuel flow to provide the maximum ramjet thrust which is available at that flight condition. Some inlets may allow operation in the slightly subcritical region, while others may require supercritical operation to avoid unsatisfactory inlet performance. The fuel control must operate so as to maintain the desired inlet operating conditions over the complete range of Mach numbers and angles of attack. The closed loop inlet margin control senses some parameter which is indicative of inlet performance, in the present application a pressure tap located in the inlet which produces a pressure signal $P_C$, and modulates fuel flow until the sensed pressure reaches the value that gives the desired inlet margin limit. The actual operating point is determined only by the accuracy with which this desired operating point can be scheduled and sensed.

Mach number and angle of attack can be synthesized from pressure measurements, so all errors can be related to errors in pressure measurements and differences in probe location and performance characteristics due to manufacturing tolerances. Since closed loop control is not influenced by many of the parameters and performance characteristics that affect an open loop mode of control, a closed loop control can meet a prescribed accuracy requirement better than an open loop control, especially if the performance characteristics of the pressure sensors are known.

More accurate inlet margin control via a closed loop schedule means that the nominal set point can be closer to the stable subcritical or supercritical operating point. This in turn provides additional acceleration margin or thrust at the critical takeover conditions which can be used for more rapid acceleration or reduced time to target, or for steeper climb angles to increase range. More acceleration margin can also be traded off to a lower required takeover Mach number which means less booster rocket requirement, and lower weight and volume.

The preferred closed loop inlet margin schedule is shown in block 94. The inlet margin schedule 94 responds to input signals of Mach number on signal line 42, and angle of attack on signal line 46, and the bi-variant schedule produces an output signal on line 96 of the parameter $P_C/P_{PL}$. This signal is fed through lead network 98 and then via line 100 to a least select circuit 102.

Also fed to the least select circuit via signal line 104 is a signal indicative of desired $P_C/P_{PL}$ produced by the Mach number limiter schedule 106. The Mach number schedule 106 produces on signal line 108 a signal indicative of Mach number reference, $M_N REF$, as a function of the input signal pressure altitude, $P_{AMB}$ on signal line 44. The output signal on line 108, $M_N REF$, is fed to a comparator 110 where it is compared with actual Mach number on signal line 42. The Mach number error, appearing on signal line 112, is fed through gain circuit 114 where it is converted to the $P_C/P_{PL}$ signal required to limit Mach number, and via line 104 to least select circuit 102.

The least select circuit 102 selects the signal on either signal line 100 or signal line 104 which calls for the least value of the $P_C/P_{PL}$, and the selected signal appears on signal line 116 as $P_C/P_{PL}$ REF. The selected signal on line 116 is then fed to comparator 118.

The actual ratio of $P_C/P_{PL}$ is produced in divider circuit 120 which receives the measured inputs $P_C$ on line 50 and $P_{PL}$ on line 52. The actual $P_C/P_{PL}$ signal from divider circuit 120 is fed via signal line 122 to comparator 118. The output from comparator 118, a signal indicative of $P_C/P_{PL}$ error, appears on signal line 124 and is fed through lead circuit 126 to comparator 128.

The Mach number schedule 106 is a maximum Mach number limit, or equivalent vehicle velocity, which is scheduled as a function of altitude to provide structural protection and prevent the vehicle from exceeding the structural and/or temperature limits. Mach number information and average static pressures are utilized to provide the maximum Mach number limit as a function of pressure altitude.

In effect, the closed loop approach to controlling supercritical margin senses combustion chamber pressure, $P_C$, compares it to the value of combustion pressure which will provide the desired inlet margin, and varies fuel flow until the sensed combustion pressure agrees with the desired value. In order to maintain the desired inlet margin over the range of operating conditions, chamber pressure over reference pressure, $P_{PL}$, is scheduled as a function of Mach number and angle of attack. The output from comparator 128 is fed through an integral control block 130 where the $K_{PC}/S$ expression in the closed loop chamber pressure control indicates that fuel flow is proportional to the integral of chamber pressure error, that is, fuel flow will vary at a rate proportional to error, and sensed chamber pressure will equal desired chamber pressure in steady state.

The output from the integral control block 130 is fed via signal line 132 to comparator 92, comparator 134, and a multiplier 136. The comparator 92 compares the signal on signal line 132, indicative of desired $W_f/P_C$ with the maximum fuel-to-air ratio signal on signal $W_f/P_C$ MAX line 90. Any error therebetween is fed via signal line 136 to a high limit circuit 138 which provides a signal on line 140, fed to comparator 128, which will limit the signal on signal line 132 to a value no higher than that on signal line 90.

Likewise, the desired $W_f/P_C$ signal on signal line 132 is fed to comparator 134 where it is compared with a $W_f/P_C$ MIN signal, generated in block 142 and fed to comparator 134 via signal line 144. Any difference therebetween is fed via signal line 146 to low limit circuit 148, a signal being sent via signal line 150 if the $W_f/P_C$ signal on signal line 132 is below the minimum scheduled in block 142.

The signal on line 132, constrainted to be between the maximum and minimum values of $W_f/P_C$ as defined by elements 74 and 142, is fed to multiplier 136. Also fed to multiplier 136 is the $P_C$ signal on line 152, measured just upstream of the fuel injectors. The output from the multiplier 136 on signal line 54 is the fuel reference signal, $W_f REF$, which is fed to a summing amplifier 154 with amplifier gain $K_A$. The output signal from the summing amplifier is torque motor current $I_{TM}$ which is fed to a torque motor and servo shown in block 156.

The output from block 156 is a mechanical position representing the desired fuel flow. Feedback occurs around the torque motor and servo via signal line 158, through a linear variable displacement transducer 160 and feedback line 162 to summing amplifier 154. The output from the torque motor and servo 156 is then fed via signal line 164 which is a mechanical linkage to valve 82 to schedule the fuel flow, $W_f$, to the nozzles via duct 62. If the electronic control 40 is digital, a digital-to-analog converter is required in line 54.

The fuel control sequence is initiated from the combustion port cover switch 76 which assures that airflow exists in the ram combustion chamber before fuel is turned on.

First the shutoff valve 80 is opened and the manifold is quick-filled. The throttle valve/pressure regulating valve 82 in the hydromechanical control 60 provides an inherent quick-fill feature. A time delay is used so that the igniter flow is available when fuel flow occurs through the injector nozzles. The light-off schedule is used until ignition occurs, approximately 0.25 seconds longer than the quick-fill features fills the manifold. The least selector 102 in the electronic control 40 chooses the lower $P_C/P_{PL}$ control signal from the inlet margin schedule 94 and the Mach number schedule 106. The closed loop integrator 130 is limited at high and low values of $W_f/P_C$ to achieve the maximum or light-off limit in schedule 74, or the minimum blowout limit in schedule 142. Lead compensation networks 126 and 98 are used to achieve fast, stable response in the closed loop pressure controls as well as to reduce inlet margin transient errors for rapid angle of attack changes.

The digital control logic functions in electronic control 40 can be programmed into a simple, low cost microprocessor or can be included in a flight control computer. The control system is sufficiently flexible to easily allow changes to assure desired performance if system components are modified or if their performance is different than anticipated.

While the invention has been described with respect to its best mode and preferred embodiment, it is apparent that modifications may be made thereto without departing from the scope of the invention as hereinafter claimed.

We claim:

1. In an integral rocket-ramjet vehicle having a combustion chamber, a source of ramjet fuel and an inlet supplying air to said combustion chamber, a fuel control for modulating the flow of fuel from said source to said combustion chamber upon termination of the rocket phase of vehicle operation comprising:
   means responsive to termination of the rocket phase of operation for producing a first signal indicative of desired fuel-to-air ratio upon ignition of said fuel in said combustion chamber, and indicative of a maximum fuel-to-air ratio after ignition of said fuel;
   means responsive to first selected vehicle operating conditions for producing a signal indicative of desired combustion chamber to reference pressure ratio to limit said vehicle maximum Mach number to a value satisfactory with regard to structural or aerodynamic heating characteristics;
   inlet margin scheduling means responsive to second selected vehicle operating conditions for scheduling a second signal indicative of desired combustion chamber to reference pressure ratio to maximize pressure recovery of the shock wave produced by airflow through said inlet;
   least select means receiving said first and second pressure ratio signals and selecting the one of said first and second signals which produces the lowest fuel-to-air ratio;
   means for measuring the pressures from which said pressure ratio signals are derived and producing a signal indicative of actual combustion chamber to reference pressure ratio;
   means for comparing the pressure ratio signal passed through said least select means with said actual pressure ratio signal and producing a pressure ratio error signal;
   closed loop integrator means for receiving said pressure ratio error signal and producing therefrom a desired fuel-to-air ratio signal which does not exceed said maximum fuel-to-air ratio; and
   fuel scheduling means including valve means responsive to said desired fuel-to-air ratio signal for metering the desired amount of fuel from said source to said combustion chamber.

2. The fuel control of claim 1 wherein said closed loop integrator means includes compensating means receiving said pressure ratio error signal and producing therefrom a first fuel-to-air ratio signal proportional to the integral of the pressure ratio error, means for comparing said first fuel-to-air ratio signal with said maximum fuel-to-air ratio signal and reducing said pressure ratio error signal when said first fuel-to-air ratio signal exceeds said maximum fuel-to-air ratio signal.

3. The fuel control of claim 2 further comprising:
   means for producing a signal indicative of a minimum fuel-to-air ratio; and
   said closed loop integrator means further including means for comparing said first fuel-to-air ratio signal with said minimum fuel-to-air ratio signal and increasing said pressure ratio error signal when said minimum fuel-to-air ratio signal exceeds said first fuel-to-air ratio signal.

4. The fuel control of claim 1 wherein said closed loop integrator means includes compensating means receiving said pressure ratio error signal and producing therefrom a first fuel-to-air ratio signal proportional to the integral of the pressure ratio error;
   means for comparing said first fuel-to-air ratio signal with said maximum fuel-to-air ratio signal and producing a first fuel-to-air ratio error signal;
   and first bound means receiving said first fuel-to-air ratio error signal and reducing said pressure ratio error signal when said first fuel-to-air ratio signal exceeds said maximum fuel-to-air ratio signal.

5. The fuel control of claim 4 and further including:
   means for producing a signal indicative of a minimum fuel-to-air ratio;
   means for comparing said first fuel-to-air ratio signal with said minimum fuel-to-air ratio signal and producing a second fuel-to-air ratio error signal;
   and second bound means receiving said second fuel-to-air ratio error signal and increasing said pressure ratio error signal when said minimum fuel-to-air ratio signal exceeds said second fuel-to-air ratio error signal.

6. The fuel control of claim 5 wherein said means for producing a signal indicative of a desired fuel-to-air ratio upon ignition and a maximum fuel-to-air ratio thereafter comprises:
   means responsive to termination of said vehicle rocket phase for producing an ignition signal;
   timing means for receiving said ignition signal;

said ignition signal initiating said timing means and producing a timing signal upon receipt by said timing means;

means for producing a signal indicative of the altitute pressure of said vehicle;

and scheduling means responsive to said timing signal and to said altitude pressure signal for scheduling a reduced maximum fuel-to-air ratio signal with a magnitude and time duration selected as a function of said pressure signal and adapted to provide optimum fuel flow to said combustion chamber upon ramjet ignition, said reduced maximum fuel-to-air ratio signal being increased after said selected time duration to said maximum fuel-to-air ratio signal.

7. The fuel control of claim 6 including igniter means for initiating combustion of said fuel in said combustion chamber;

time delay means;

means for feeding said igniter signal to said time delay means whereby said ignition signal is delayed;

and means feeding said time delayed ignition signal to said igniter means.

8. The fuel control of claim 7 including a shut-off solenoid for said fuel metering means whereby said fuel metering means is closed during the rocket phase of operation;

and means for feeding said ignition signal to said shut-off solenoid to open said fuel metering means upon the occurrence of said ignition signal.

9. The fuel control of claim 1 wherein said reference pressure is the pressure sensed by a pilot probe located on the cowl lip or compression ramp of said air inlet.

10. The fuel control of claim 3 further including means for multiplying said desired fuel-to-air ratio signal by actual combustion chamber pressure to produce a fuel flow reference signal; said valve means being responsive to said fuel flow reference signal for metering fuel to said combustion chamber.

11. In an integral rocket-ramjet vehicle having a combustion chamber, a source of ramjet fuel and an inlet supplying air to said combustion chamber, a fuel control for modulating the flow of fuel from said source to said combustion chamber upon termination of the rocket phase of vehicle operation, comprising:

means for scheduling a first pressure ratio signal indicative of the difference between vehicle velocity and a vehicle velocity limit;

means for scheduling a second pressure ratio signal indicative of optimum inlet performance for said vehicle operating conditions;

least select means receiving said first and second pressure ratio signals and passing therethrough the lower of said pressure ratio signals;

means for comparing the pressure ratio signal passed by said least select means with the actual value of said pressure ratio to produce a pressure ratio error signal;

signal compensating means receiving said pressure ratio error signal and producing therefrom a first fuel-to-air ratio signal variable at a rate proportional to said pressure ratio error signal;

multiplier means receiving said first fuel-to-air ratio signal and a signal indicative of actual airflow for producing a desired fuel flow signal;

and hydromechanical control means including a fuel control valve responsive to said desired fuel flow signal for varying the flow of fuel to said combustion chamber.

12. The fuel control of claim 11 and including means for producing a maximum fuel-to-air ratio signal;

means for producing a minimum fuel-to-air ratio signal; and means for maintaining said first fuel-to-air ratio signal within the limits of said maximum and minimum fuel-to-air ratio signals.

13. A fuel control as in claim 12 in which said means for producing maximum fuel-to-air ratio signal includes means for scheduling a reduced maximum fuel-to-air ratio upon initiation of ramjet fuel flow to said combustion chamber.

* * * * *

UNITED STATES PATENT AND TRADEMARK OFFICE
CERTIFICATE OF CORRECTION

PATENT NO. : 4,277,940

DATED : July 14, 1981

INVENTOR(S) : Kermit I. Harner; John P. Patrick

It is certified that error appears in the above—identified patent and that said Letters Patent is hereby corrected as shown below:

Column 1, line 5, "F33614-74-C-2059" should be

--F33615-74-C-2059--.

Column 2, line 38, "thefore" should be --therefore--.

Signed and Sealed this

Twenty-fifth Day of May 1982

[SEAL]

Attest:

GERALD J. MOSSINGHOFF

Attesting Officer   Commissioner of Patents and Trademarks